(12) United States Patent
Kirsch et al.

(10) Patent No.: US 11,480,653 B2
(45) Date of Patent: Oct. 25, 2022

(54) METHOD AND APPARATUS FOR CORRECTING A RADAR SIGNAL, AND RADAR DEVICE

(71) Applicant: Robert Bosch GmbH, Stuttgart (DE)

(72) Inventors: Andreas Kirsch, Leonberg (DE); Michael Schoor, Stuttgart (DE); Stefan Engewald, Osterburken (DE); Stefan Heilmann, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 265 days.

(21) Appl. No.: 16/765,850

(22) PCT Filed: Nov. 15, 2018

(86) PCT No.: PCT/EP2018/081483
§ 371 (c)(1),
(2) Date: May 20, 2020

(87) PCT Pub. No.: WO2019/141408
PCT Pub. Date: Jul. 25, 2019

(65) Prior Publication Data
US 2020/0363496 A1    Nov. 19, 2020

(30) Foreign Application Priority Data
Jan. 18, 2018    (DE) .......................... 102018200753.5

(51) Int. Cl.
*G01S 13/931* (2020.01)
*G01S 7/02* (2006.01)
*G01S 7/40* (2006.01)
(52) U.S. Cl.
CPC .............. *G01S 7/023* (2013.01); *G01S 7/40* (2013.01); *G01S 13/931* (2013.01)

(58) Field of Classification Search
CPC ............................. G01S 7/023; G01S 13/931
See application file for complete search history.

(56) References Cited

U.S. PATENT DOCUMENTS 6,140,954 A * 10/2000 Sugawara ............. G01S 13/536
367/101
2013/0166239 A1 * 6/2013 Ota ........................ G06T 5/002
356/497

FOREIGN PATENT DOCUMENTS

| DE | 102014112806 A1 | 3/2016 |
| EP | 0954755 A1 | 11/1999 |
| EP | 3173812 A1 | 5/2017 |
| JP | 2006171001 A | 6/2006 |
| JP | 2008232830 A | 10/2008 |

(Continued)

OTHER PUBLICATIONS

International Search Report for PCT/EP2018/081483, dated Feb. 22, 2019.

*Primary Examiner* — Timothy A Brainard
(74) *Attorney, Agent, or Firm* — Norton Rose Fulbright US LLP; Gerard Messina

(57) ABSTRACT

A method for correcting a radar signal. The method includes the following steps: ascertaining main peaks in the spectrum of the radar signal; determining an auxiliary signal by removing the components of the main peaks in the radar signal; identifying regions of disturbance in the radar signal utilizing the auxiliary signal; and generating a corrected radar signal by interpolating the radar signal in the identified regions of disturbance of the radar signal, utilizing the main peaks through ascertained.

10 Claims, 16 Drawing Sheets

(56) References Cited

FOREIGN PATENT DOCUMENTS

| JP | 2009139321 A | * | 6/2009 |
|----|--------------|---|--------|
| JP | 2009139321 A |   | 6/2009 |
| JP | 2010014488 A |   | 1/2010 |
| JP | 2015224899 A |   | 12/2015 |

* cited by examiner

METHOD AND APPARATUS FOR CORRECTING A RADAR SIGNAL, AND RADAR DEVICE

FIELD

The present invention relates to a method for correcting a radar signal, an apparatus for correcting a radar signal, and a radar device.

BACKGROUND INFORMATION

Radar sensors are increasingly being drawn on to assist the driver as well as to implement autonomous driving. They are usually continuous wave radar systems which are operated in the 76 GHz band. The FMCW (frequency modulated continuous wave) modulation and its further developments and modifications are particularly widespread. In that case, the frequency of the emitted radar waves is modulated periodically. The passage from the lowest frequency to the highest frequency is known as signal sequence or burst. In addition to the frequency deviation, that is, the difference between the lowest and the highest frequency of a respective FMCW ramp, the radar system is characterized by the rise of the frequency, which is limited, however, by the bandwidth of the receiver.

The more vehicles there are on the road which have radar sensors, the greater the danger of unwanted cross influences and interference effects. In the case of interferences, the gradient of the ego FMCW ramp is generally not identical with the gradient of an interfering FMCW ramp. Consequently, a chirp signal results in the baseband, whose frequency increases continuously from the negative highest baseband frequency to the positive highest baseband frequency or vice versa. The corresponding period of time is defined by the differences in the gradient of the respective ramp as well as by the sampling rate.

To reduce interference effects, German Patent No. 10 2014 112 806 A1 describes a radar sensor which has a controllable on/off switch in order to suppress or interrupt the forwarding of a signal to the transmitting antenna of the radar sensor.

The duration of the interference is particularly important, since in removing time domains from the radar signal, the longer the time domain, the stronger the artifacts which occur.

SUMMARY

The present invention provides a method for correcting a radar signal, an apparatus for correcting a radar signal, and a radar device.

According to a first aspect, the present invention provides a method for correcting a disturbed radar signal. In accordance with an example embodiment of the present invention, main peaks are ascertained in the spectrum of the radar signal. An auxiliary signal is determined by removing the components of the main peaks in the radar signal. Regions of disturbance in the radar signal are identified utilizing the auxiliary signal. A corrected radar signal is generated by interpolating the radar signal in the identified regions of disturbance of the radar signal, utilizing the main peaks ascertained.

According to a second aspect, the present invention provides an apparatus for correcting a disturbed radar signal, having an interface which receives a radar signal. In one example embodiment according to the present invention, the apparatus further includes a computing device which is coupled to the interface and ascertains main peaks in the spectrum of the radar signal, determines an auxiliary signal by removing the components of the main peaks in the radar signal, identifies regions of disturbance in the radar signal utilizing the auxiliary signal, and generates a corrected radar signal by interpolating the radar signal in the identified regions of disturbance of the radar signal, utilizing the main peaks ascertained.

According to another aspect, the present invention provides a radar device having a transmission/reception unit which emits radar waves and receives reflections of the radar waves, and outputs a radar signal on the basis of the reflections received. The example radar device also includes an apparatus for correcting the output radar signal in accordance with the present invention.

Preferred specific embodiments of the present invention are described herein.

According to the present invention, regions of disturbance are identified and the radar signal is corrected in these regions. However, the radar signal is not set to zero or interpolated linearly in the regions of disturbance, which would lead to strong artifacts that would grow as the size of the regions of disturbance increases. Rather, an interpolation is carried out on the basis of the ascertained main peaks. This allows the radar signal to continue through essentially smooth courses in the regions of disturbance caused by the interference. Since the interpolated radar signal in the regions of disturbance now corresponds to the main peaks, which in general, can be attributed to objects in the area surrounding the radar, additional artifacts may be avoided. In this connection, it is particularly advantageous that the interpolation depends only slightly on the size of the region of disturbance itself. Even in the case of prolonged interferences which extend over a large number of samples, undisturbed operation of the radar may be ensured owing to the correction of the radar signal. The spectral noise is reduced and the detection of targets is improved.

A radar signal for the purpose of the present invention is understood to be an amplitude characteristic over time, the spectrum of the radar signal being obtained by performing a Fourier transform on the radar signal.

According to one preferred further development of the example method according to the present invention, the main peaks are ascertained with the aid of a peak-detection algorithm. For example, the CFAR (constant false alarm rate) algorithm may be used.

According to one further development of the example method according to the present invention, a main signal is calculated by performing an inverse Fourier transform on the components of the main peaks in the spectrum of the radar signal, the auxiliary signal being calculated by subtracting the main signal from the radar signal. According to this specific embodiment, the main peaks are removed in the time domain.

According to one preferred further development of the example method according to the present invention, a difference signal is determined by removing the components of the main peaks in the spectrum of the radar signal, and the auxiliary signal is determined by performing an inverse Fourier transform on the difference signal. According to this specific embodiment, the main peaks are removed in the frequency domain.

According to one preferred further development of the example method according to the present invention, a starting instant or a final instant of at least one of the regions of disturbance is detected, if a change in an amplitude of the auxiliary signal over time exceeds or drops below a predetermined threshold value.

According to one preferred further development of the example method according to the present invention, a region of disturbance is determined as the smallest time domain, within which lie all instants at which an amplitude of the auxiliary signal exceeds a predetermined threshold value.

According to one preferred further development of the example method according to the present invention, the generating of the corrected radar signal includes the generation of a main signal by performing an inverse Fourier transform on the main peaks and the interpolation of the radar signal in the identified regions of disturbance with the aid of the main signal.

According to one preferred further development of the example method according to the present invention, the generating of the corrected radar signal includes performing an inverse Fourier transform on the spectrum of the radar signal in order to recover the radar signal and interpolating the recovered radar signal in the identified regions of disturbance of the radar signal, utilizing the main peaks ascertained. According to this specific embodiment, it is possible to dispense with the storage of the original radar signal. Only the spectrum of the radar signal, that is, the Fourier-transformed radar signal or radar signal in the frequency domain, is necessary for the intermediate processing, i.e., for detecting the main peaks as well as for calculating the auxiliary signal. To recover the original radar signal, an inverse Fourier transform is performed on the Fourier-transformed radar signal. As a result, at each instant, either the radar signal or the Fourier-transformed radar signal must be stored, but not both signals, so that it is possible to save on memory space.

Figure 1:
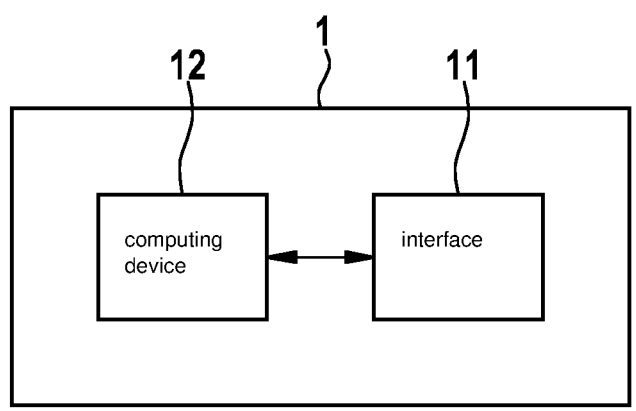
FIG. 1 shows a schematic block diagram of an apparatus for correcting a radar signal according to one specific embodiment of the present invention.

In all figures, identical or functionally identical elements and devices are provided with the same reference numerals. The numbering of method steps is used for clarity, and in general, is not intended to imply any specific time sequence. In particular, several method steps may also be carried out simultaneously.

DETAILED DESCRIPTION OF EXAMPLE EMBODIMENTS

FIG. 1 shows a schematic block diagram of an apparatus 1 according to one specific embodiment of the present invention. Apparatus 1 includes an interface 11 which is designed to receive a radar signal via a cable connection or a cableless connection. Apparatus 1 may be integrated into a radar device which is mounted in a vehicle, for example. However, apparatus 1 may also be spatially separate from the radar device, for instance, may be provided in a server outside of the vehicle and be adapted to evaluate the radar data from a large number of radar devices. Apparatus 1 is able to transmit the corrected radar signals back to the radar device via interface 11.

Apparatus 1 also includes a computing device 12 which includes one or more microprocessors that are designed to process the radar signal. To that end, computing device 12 is designed to transform the received radar signal, which is represented in the time domain, by a Fourier transform into the frequency domain, and thereby to calculate the spectrum of the radar signal. Computing device 12 ascertains main peaks in the spectrum of the radar signal. Main peaks are understood to be those peaks or signal peaks in the spectrum of the radar signal which, based on their size, generally do not stem from noise or disruptive influences, but rather may be attributed to objects in the area surrounding the radar device. The main peaks may be identified with the aid of conventional peak-detection algorithms. In particular, those peaks may be recognized as main peaks whose amplitude or signal power lies above a predetermined threshold value. The gradient of the respective peaks may also be taken into account for identifying the main peaks.

Computing device 12 is designed to remove the components of the main peaks from the radar signal. For example, to that end, computing device 12 may set to zero or subtract the components of the main peaks in the frequency domain, that is, from the Fourier-transformed radar signal, in order to generate a difference signal. The difference signal, inverse-transformed by an inverse Fourier transform, corresponds to the radar signal in the time domain without main peaks.

However, computing device 12 may also be designed to first of all transform the components of the main peaks into the time domain by an inverse Fourier transform, and thereby to generate a main signal which represents that component of the radar signal which stems solely from the main peaks. The main signal is subsequently subtracted from the radar signal in order to determine the auxiliary signal, only the shares of noise as well as the shares of unwanted interferences remaining in the auxiliary signal.

Computing device 12 evaluates auxiliary signal 5 by identifying regions of disturbance. Regions of disturbance may be understood to be those time intervals in the auxiliary signal or in the radar signal which can be attributed to unwanted interferences with other radar signals. For example, to ascertain a region of disturbance, computing device 12 may analyze the absolute value or the change in the amplitude of the auxiliary signal and recognize the beginning of a region of disturbance if the absolute value or the change in amplitude exceeds a predetermined threshold value.

Computing device 12 generates a corrected radar signal by correcting the radar signal in regions of disturbance. To that end, the regions of disturbance are cut out and replaced by an interpolated signal. The interpolated signal is determined on the basis of the main signal, i.e., on the basis of the components of the main peaks in the radar signal. For instance, for each region of disturbance, the radar signal may be replaced by the corresponding region in the main signal. The region of disturbance is thereby corrected for the share of the interference as well as possibly for additional shares of noise. Since in the absence of interferences, the main peaks have the greatest portion of the radar signal, the interpolated signal will proceed essentially steadily at the boundaries of the regions of disturbance. According to further specific embodiments, the interpolated signal may be transformed in such a way that a smooth transition at the boundaries of the regions of disturbance is ensured.

Corrected radar signal 3 may be output via interface 11 and evaluated by further devices.

Figure 2:
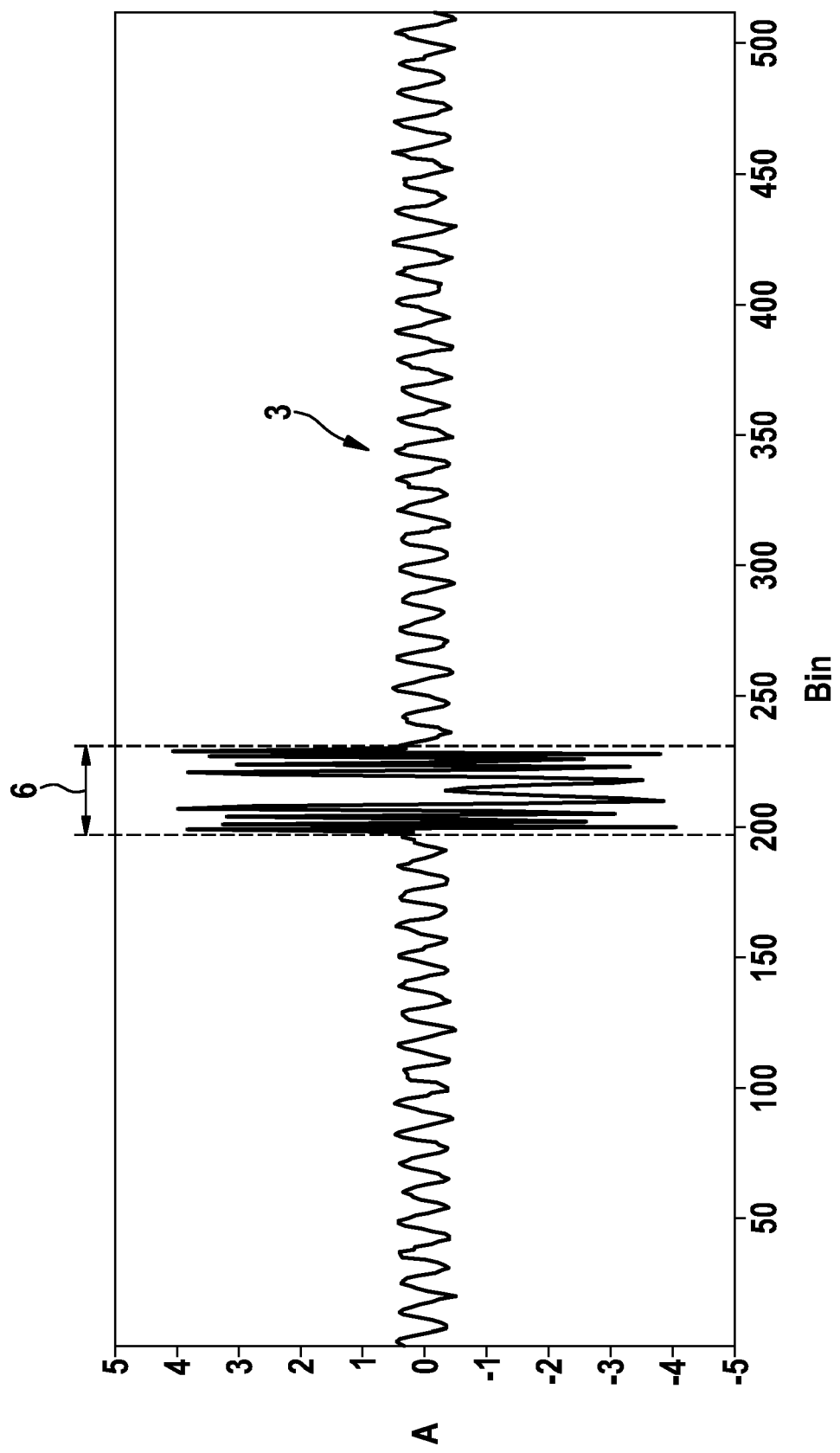
FIG. 2 shows an exemplary characteristic of a first radar signal.

Individual aspects of the present invention shall be explained in greater detail with reference to the following figures. Thus, FIG. 2 shows an exemplary radar signal 3. Amplitude A is plotted as a function of time, the amplitude values being indicated for the individual bins. Radar signal 3 stems from relatively weak targets, each of which supplies a sinusoidal contribution to radar signal 3. Strong interference signals superimpose in a region of disturbance 6, in which in the example shown, because of the interference effects, the amplitude values markedly exceed the amplitude values of radar signal 3 without disturbance.

Figure 3:
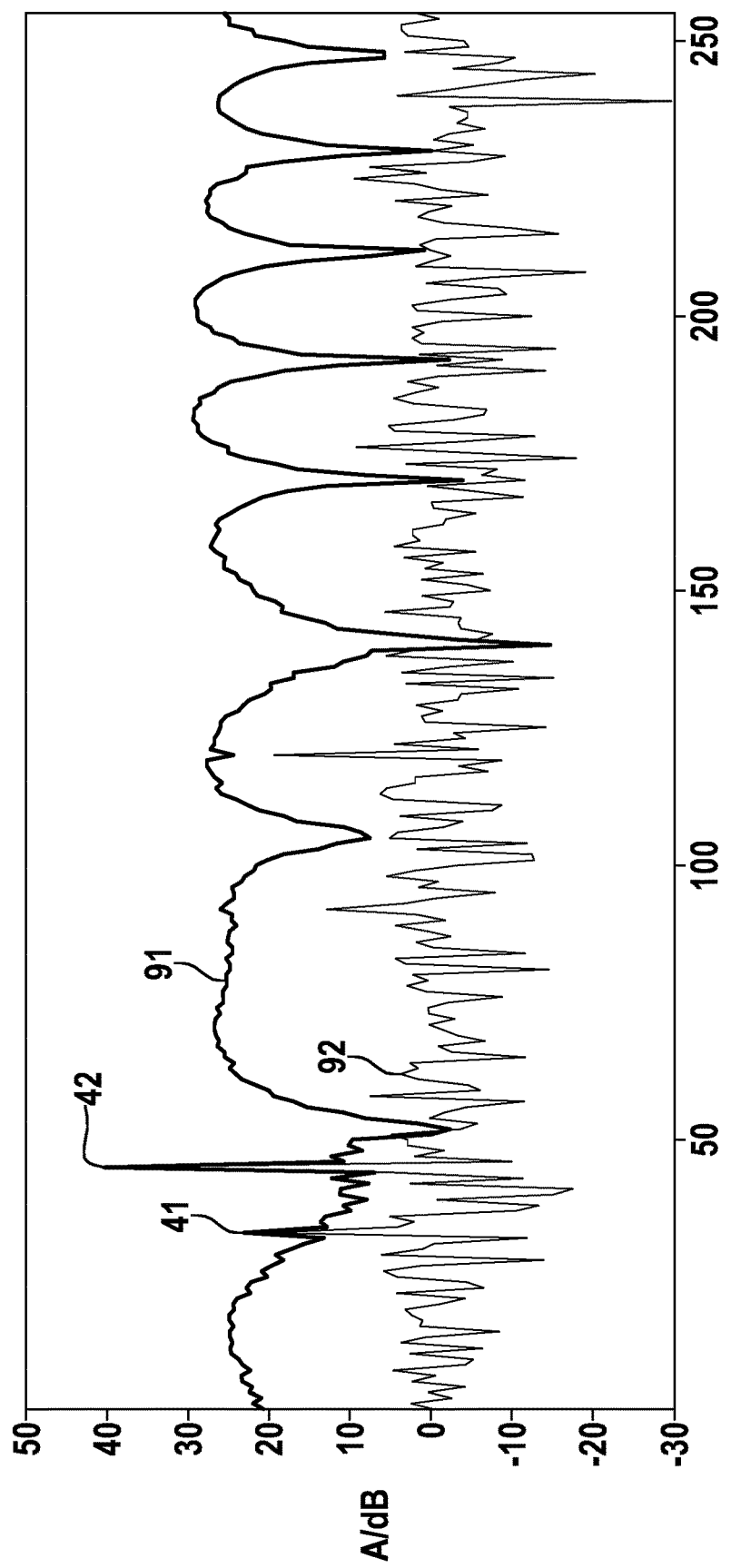
FIG. 3 shows an exemplary amplitude characteristic of the first radar signal in the frequency domain with and without interference.

Fourier-transformed radar signal 3, i.e., the spectrum of radar signal 3, is illustrated in FIG. 3. Spectrum 91 with interferences is compared to spectrum 92 in the absence of interferences. As can be seen, the interference effects increase the noise level by approximately 20 decibels.

Computing device 12 determines the positions of main peaks 41, 42 and ascertains the position of region of disturbance 6 with the aid of the methods described above.

Figure 4:
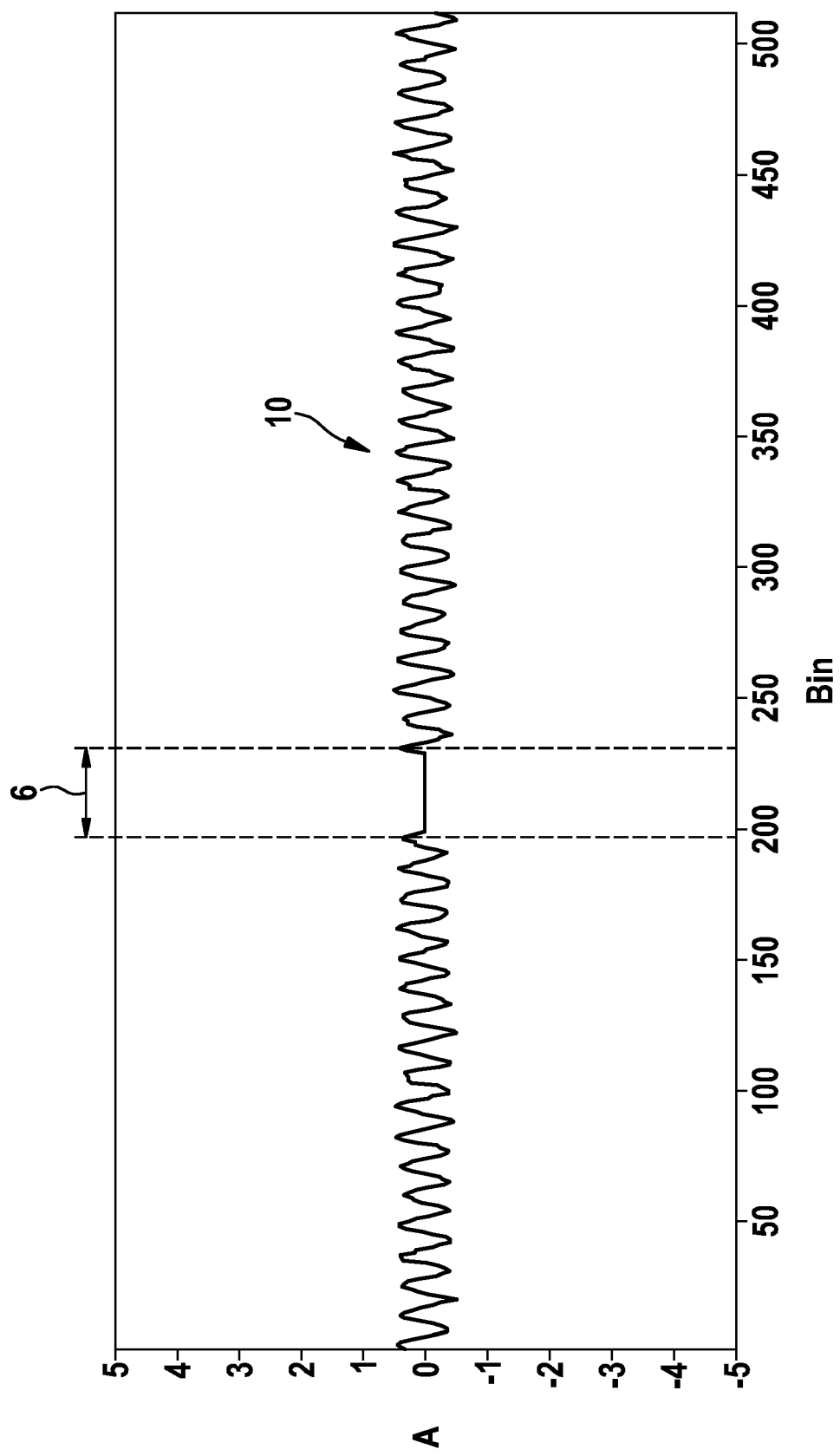
FIG. 4 shows an illustration of a correction of the first radar signal by zeroizing.
Figure 5:
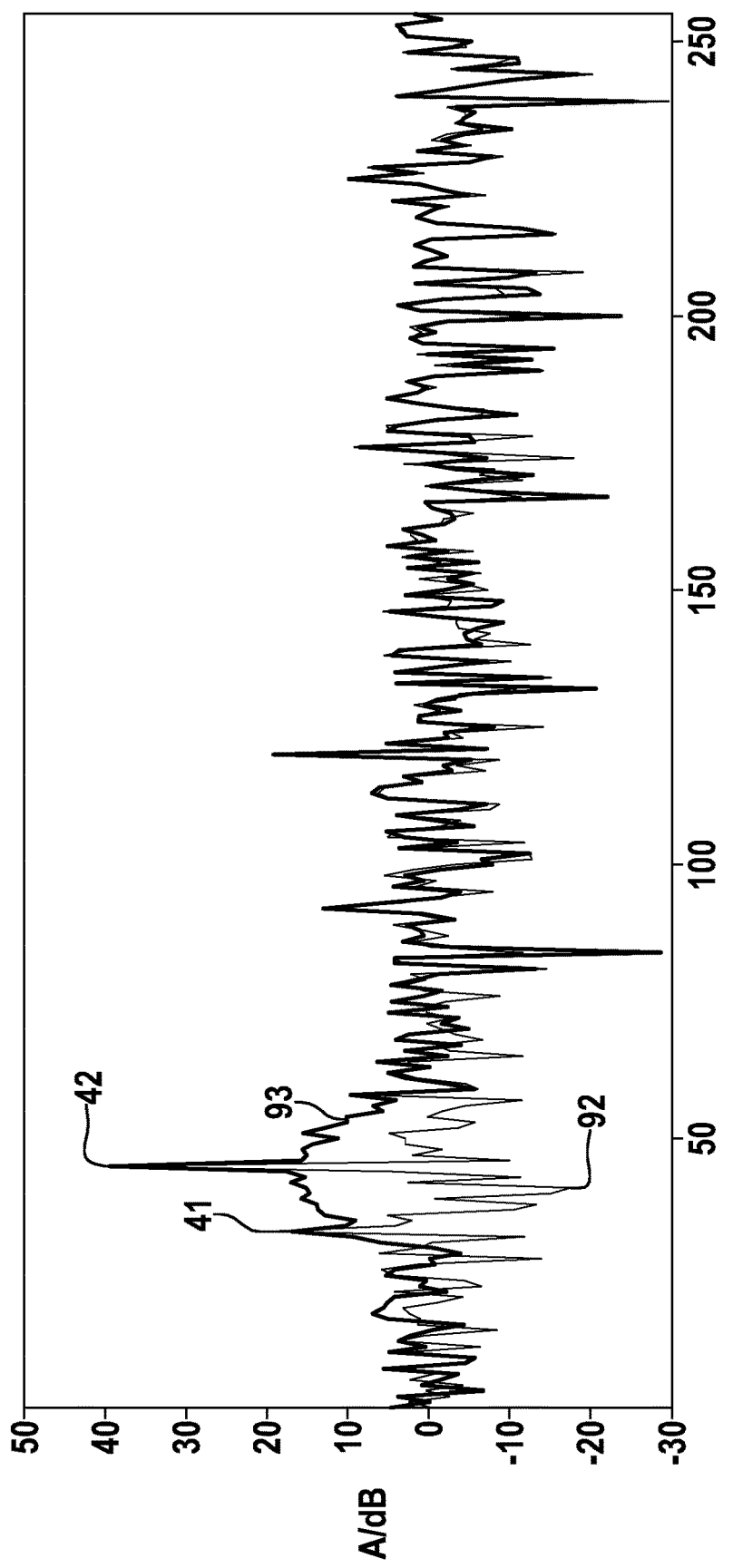
FIG. 5 shows an exemplary amplitude characteristic of the first radar signal in the frequency domain with and without correction by zeroizing.

FIG. 4 illustrates an exemplary corrected radar signal 10 which would be obtained if radar signal 3 were to be corrected in region of disturbance 6 by so-called "zeroizing", that is, by replacing the signal values within region of disturbance 6 with the value zero. In this manner, spectrum 93 of corrected radar signal 10 shown in FIG. 5 would be obtained, which is compared to spectrum 92 of radar signal 3 in the absence of interferences. As can be seen, the noise level may be reduced by zeroizing, however, strong artifacts develop in the region of main peaks 41, 42. According to the present invention, region of disturbance 6 is therefore not corrected by zeroizing, but rather by interpolation on the basis of the main signal.

Figure 6:
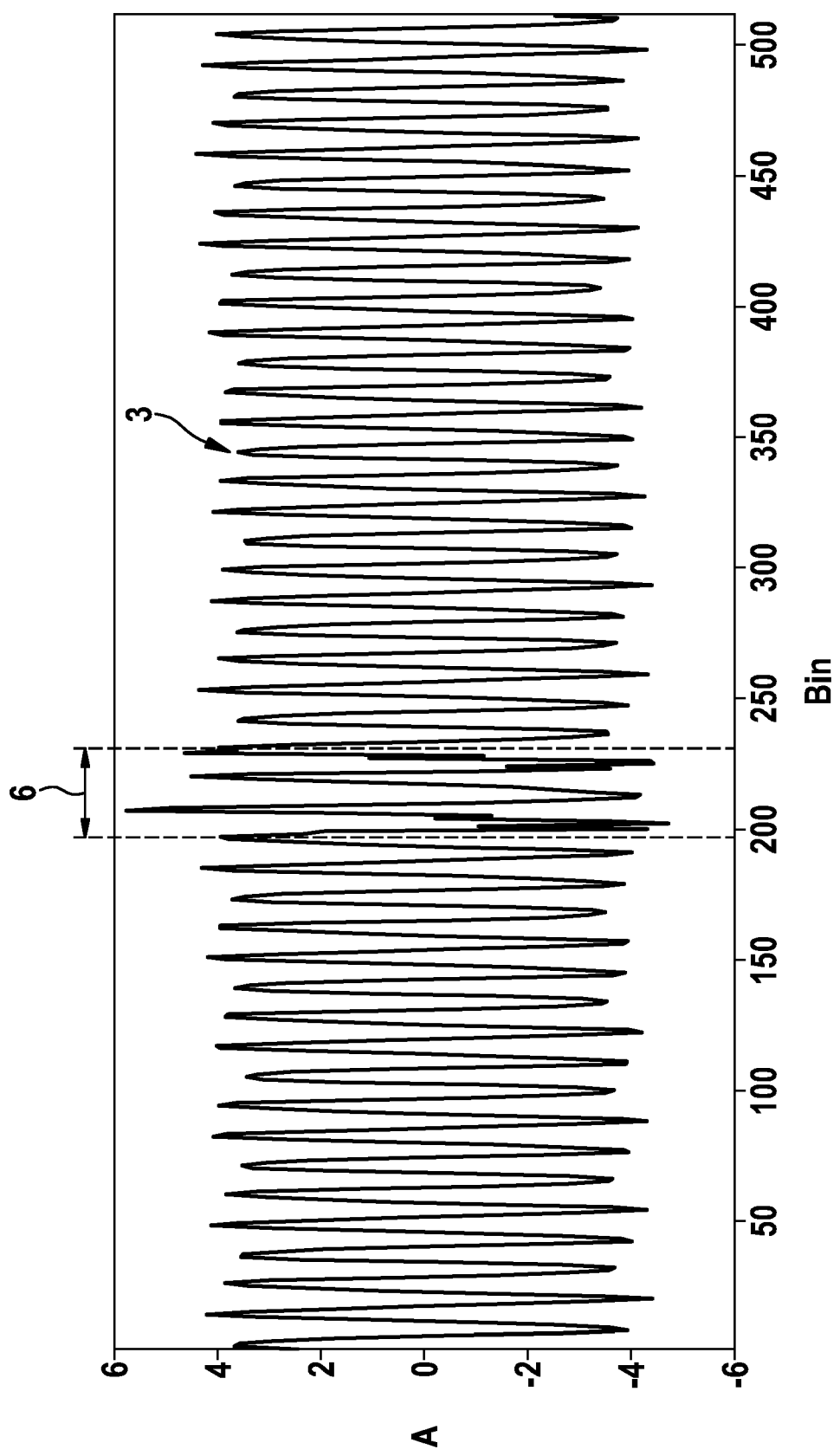
FIG. 6 shows an exemplary characteristic of a second radar signal.

This shall be explained in greater detail for a further exemplary radar signal 3 with reference to FIGS. 6 through 12. Thus, FIG. 6 shows radar signal 3, in which interferences again occur in a region of disturbance 6. In contrast to radar signal 3 illustrated in FIG. 2, the interference is not as easy to recognize on the basis of radar signal 3, since the amplitude of the disturbance turns out to be considerably less.

Figure 7:
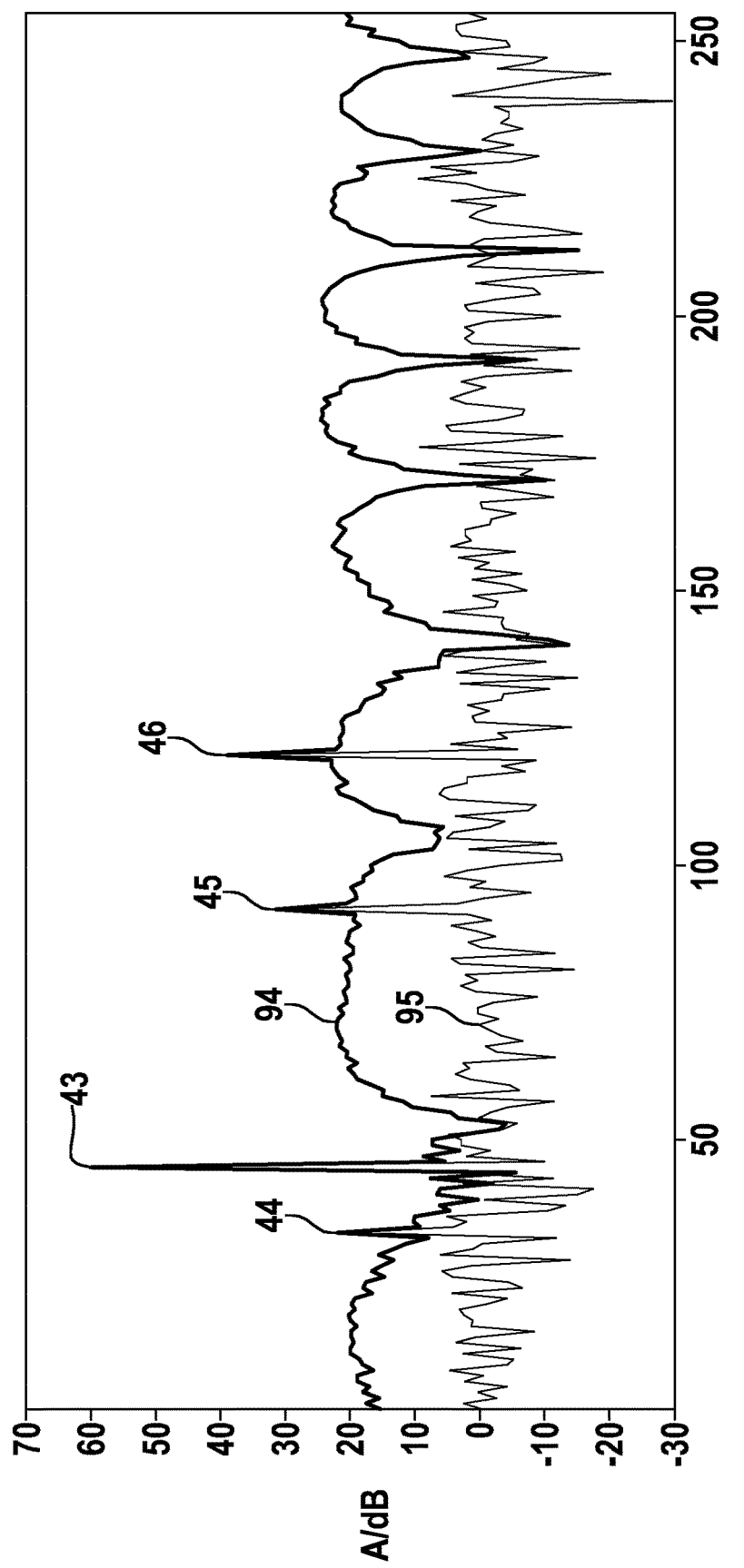
FIG. 7 shows an exemplary amplitude characteristic of the second radar signal in the frequency domain with and without interference.

FIG. 7 illustrates spectrum 94 of radar signal 3 with the interferences in region of disturbance 6, as well as a corresponding spectrum 95 of radar signal 3 in the absence of interferences. One main peak 43 from a strong source as well as three further main peaks 44 through 46 from somewhat weaker sources are able to be discerned in the spectrum.

Figure 8:
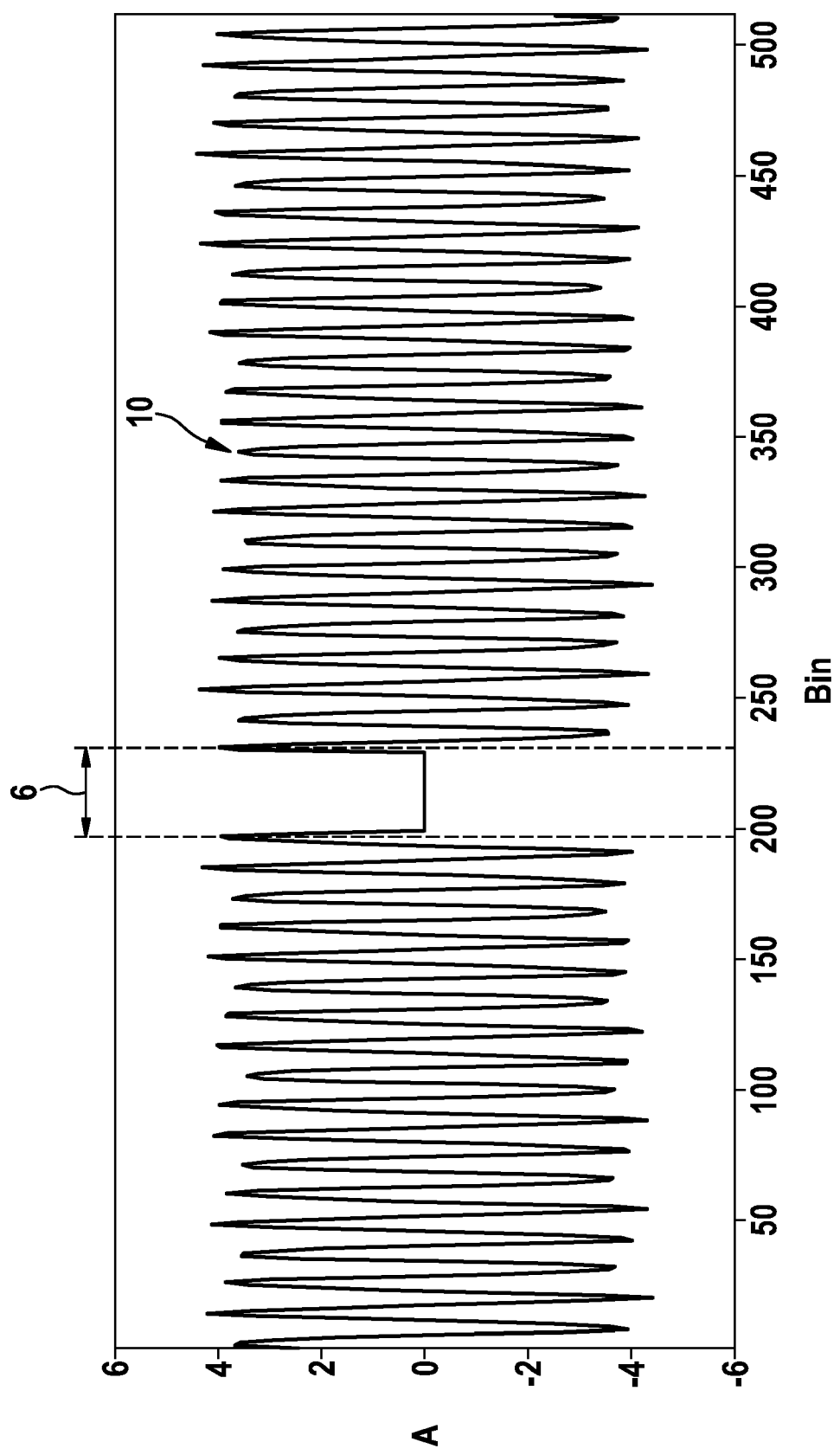
FIG. 8 shows an illustration of a correction of the second radar signal by zeroizing.
Figure 9:
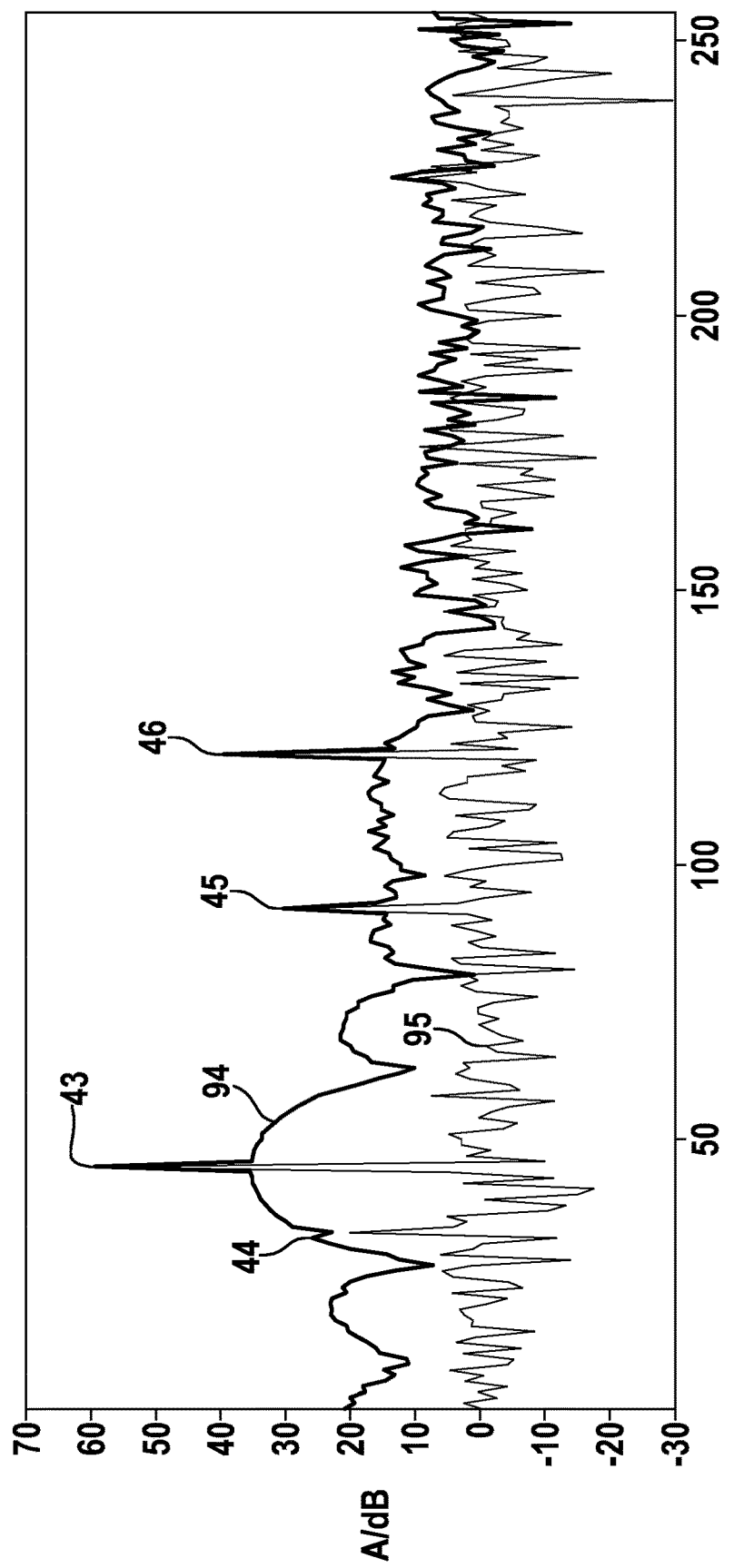
FIG. 9 shows an exemplary amplitude characteristic of the second radar signal in the frequency domain with and without correction by zeroizing.

In response to zeroizing, corrected radar signal 10 shown in FIG. 8 would result, as well as the course of spectrum 94 of corrected radar signal 10 shown in FIG. 9, which is plotted in comparison to a spectrum 95 of radar signal 3 without interferences. Considerable artifacts may again be discerned in the region around main peaks 43 through 46.

Figure 10:
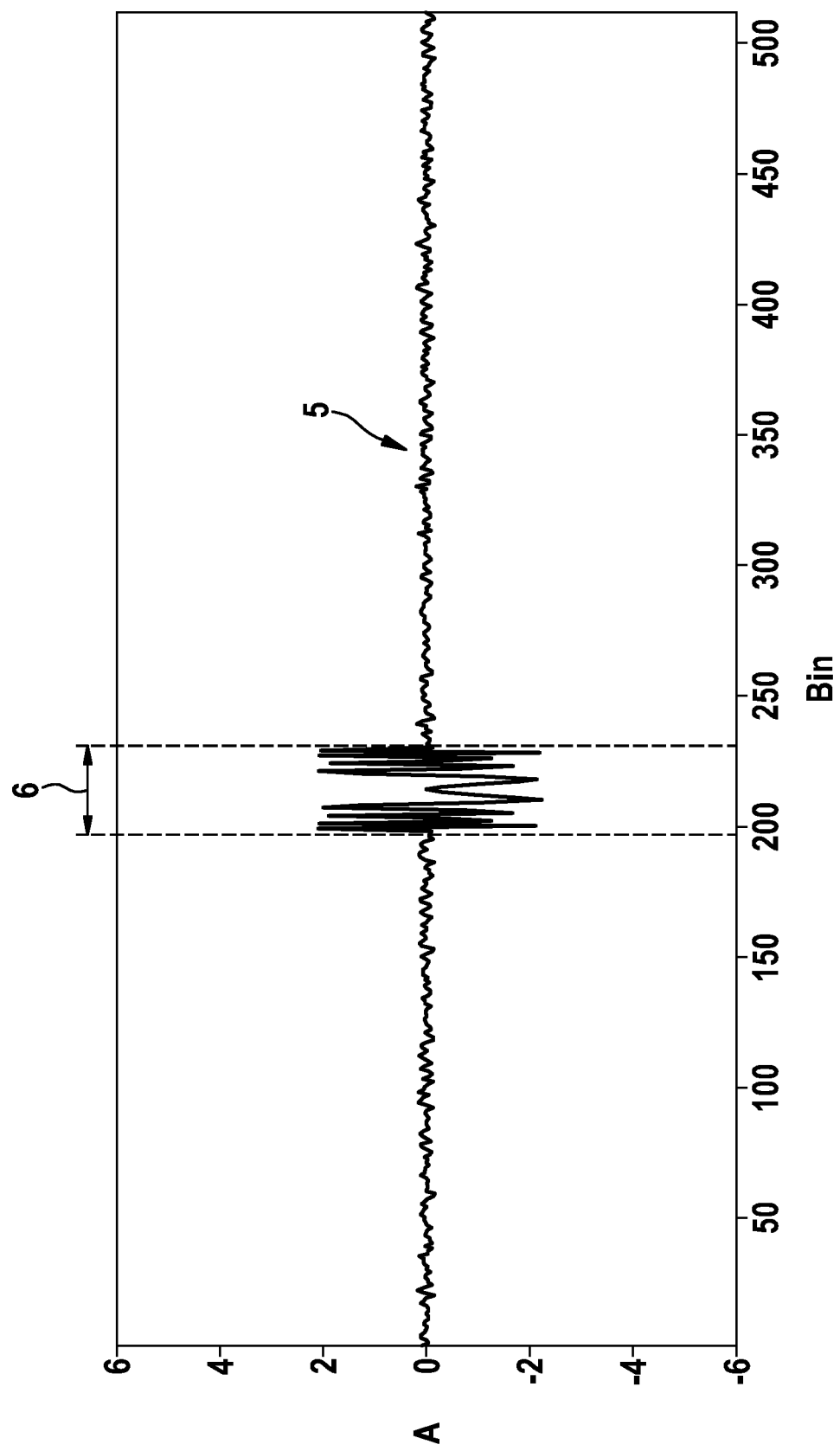
FIG. 10 shows an exemplary characteristic of an auxiliary signal.

That is why according to the present invention, radar signal 3 is not corrected by zeroizing, but rather by interpolation. To that end, computing device 12 determines the exact frequencies of main peaks 43 through 46 and calculates a corresponding main signal by a Fourier transform. If the main signal is subtracted from radar signal 3, an auxiliary signal 5 shown in FIG. 10 is obtained in the time domain, auxiliary signal 5 containing only the components of noise and the components of the interferences. The interference components are usually considerably more pronounced than the noise components.

Computing device 12 is able to ascertain region of disturbance 6 based on a threshold value for the value of the amplitude or based on the increase of the amplitude. For example, computing device 12 is able to detect that amplitude A exceeds a predetermined threshold value. In this manner, the boundary points of regions of disturbance 6 are able to be recognized. For example, region of disturbance 6 may be identified as that region within which lie all instants at which amplitude A of auxiliary signal 5 exceeds the threshold value.

Figure 11:
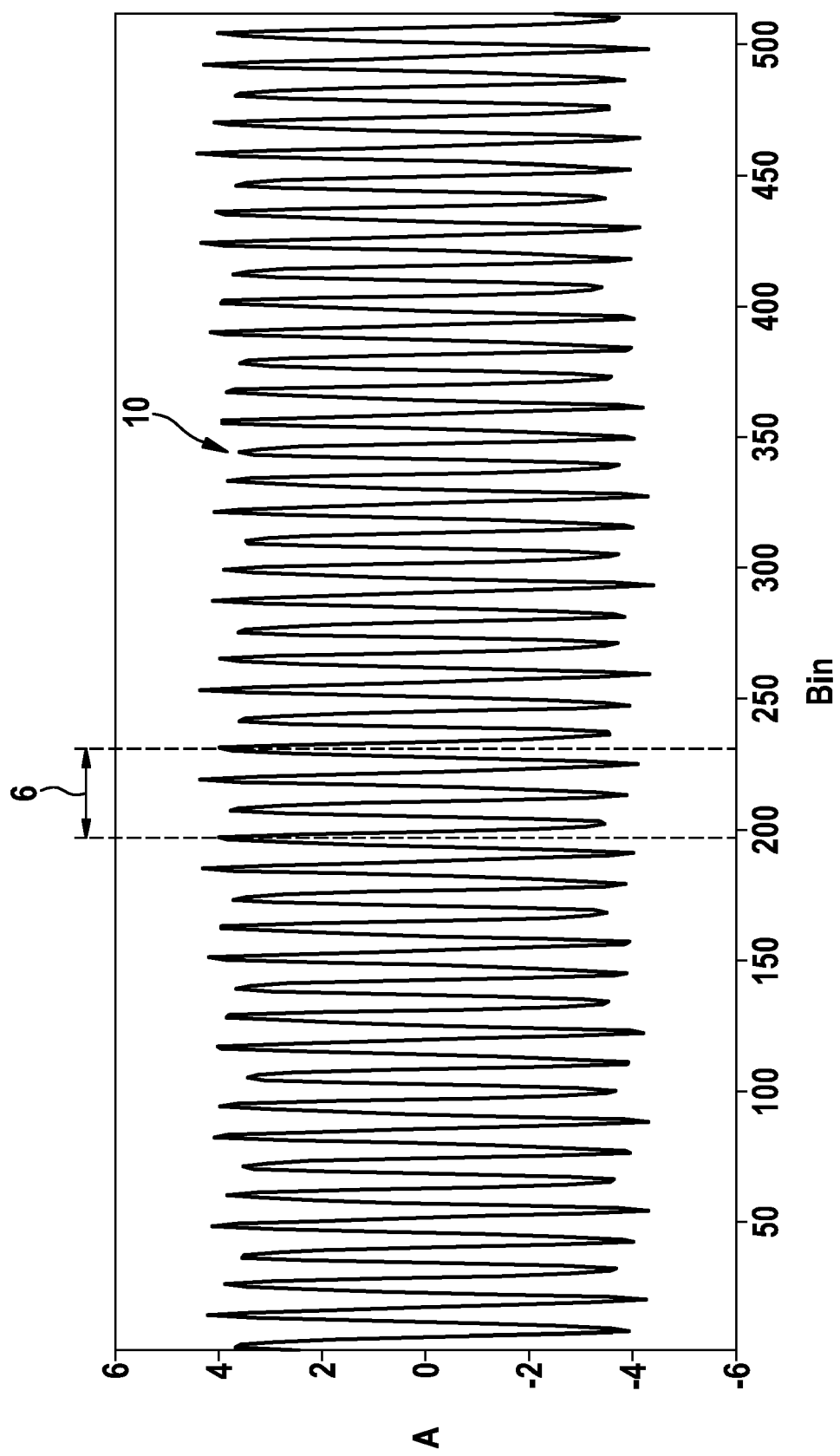
FIG. 11 shows an illustration of a correction of the second radar signal by interpolation.

Computing device 12 interpolates radar signal 3 in ascertained region of disturbance 6 on the basis of the main signal. Corrected radar signal 10 obtained in this manner is illustrated in FIG. 11. As can be seen, corrected radar signal 10 has an essentially smooth profile, even within region of disturbance 6.

Figure 12:
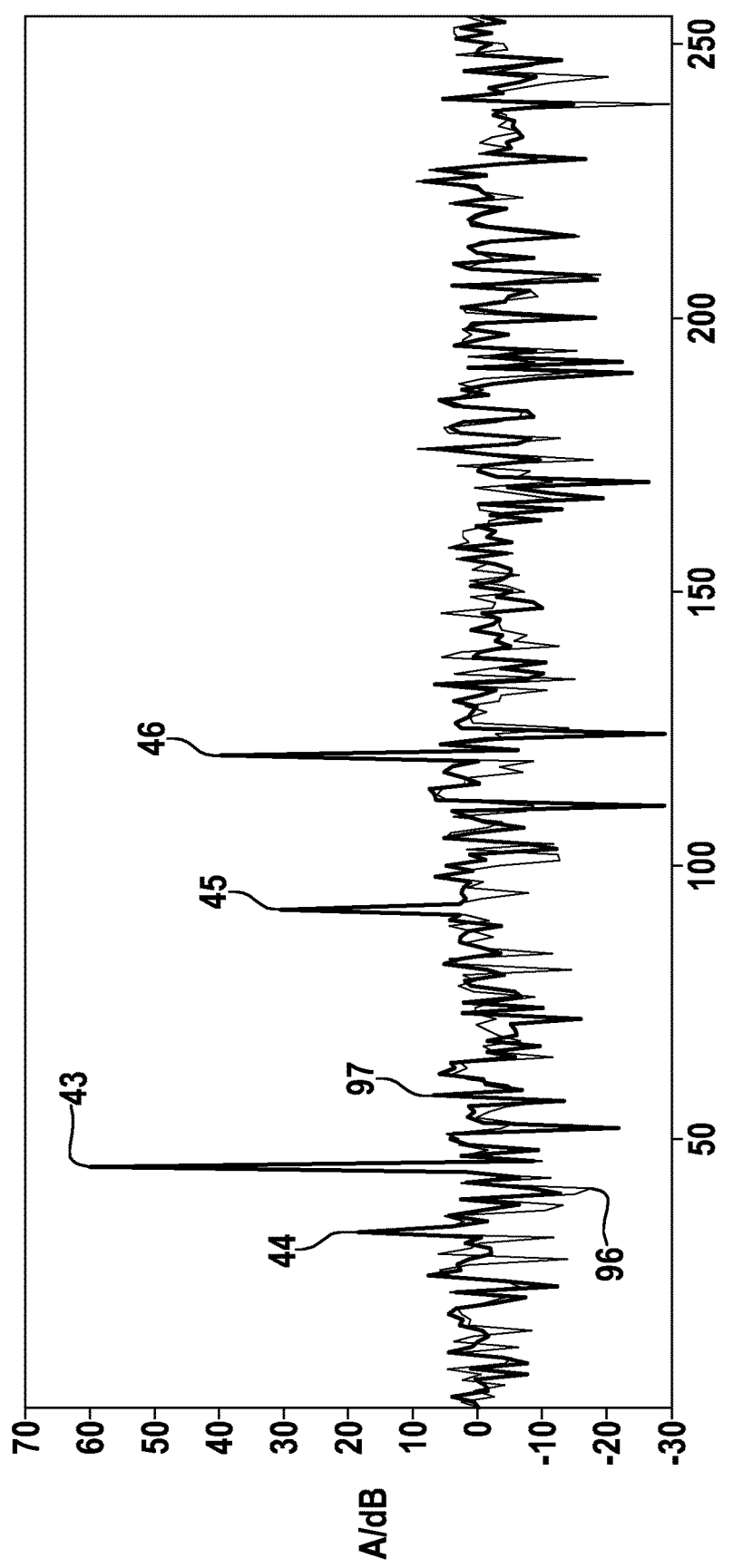
FIG. 12 shows an exemplary amplitude characteristic of the second radar signal in the frequency domain with and without correction by interpolation.

FIG. 12 shows spectrum 96 of corrected radar signal 10 and spectrum 97 of radar signal 3 without interferences. It can be seen that the differences are very small and, in particular, the artifacts in the region around main peaks 43 through 46 have disappeared.

The detection of regions of disturbance 6 and the corresponding correction may be carried out individually for each FMCW ramp (chirp). However, it is also possible to detect the main peaks in the spectrum over several chirps. By suitable statistical analysis, for instance, averaging, and determination of variance and median, it is possible to attain a more robust calculation of threshold values to detect the main peaks, particularly if the main peaks differ only slightly from each other between individual chirps.

Figure 13:
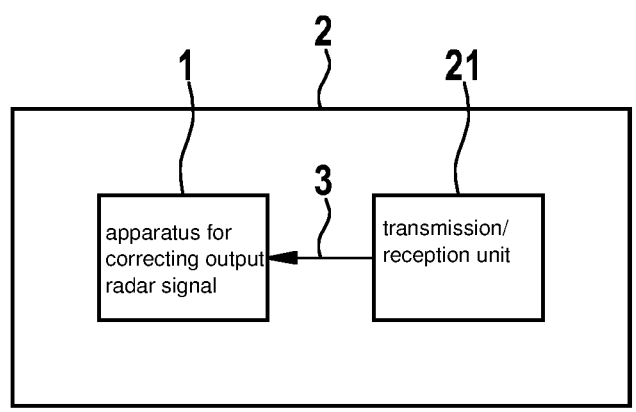
FIG. 13 shows a schematic block diagram of a radar device according to one specific embodiment of the present invention.

FIG. 13 illustrates a block diagram of a radar device 2 according to one specific embodiment of the present invention. Radar device 2 has a transmission/reception unit 21 which emits radar waves and receives the reflections of the emitted radar waves. Based on the radar waves, transmission/reception unit 21 generates a radar signal 3 which is transmitted to an apparatus 1 for correcting output radar signal 3. Apparatus 1 is designed according to one of the specific embodiments described above.

Figure 14:
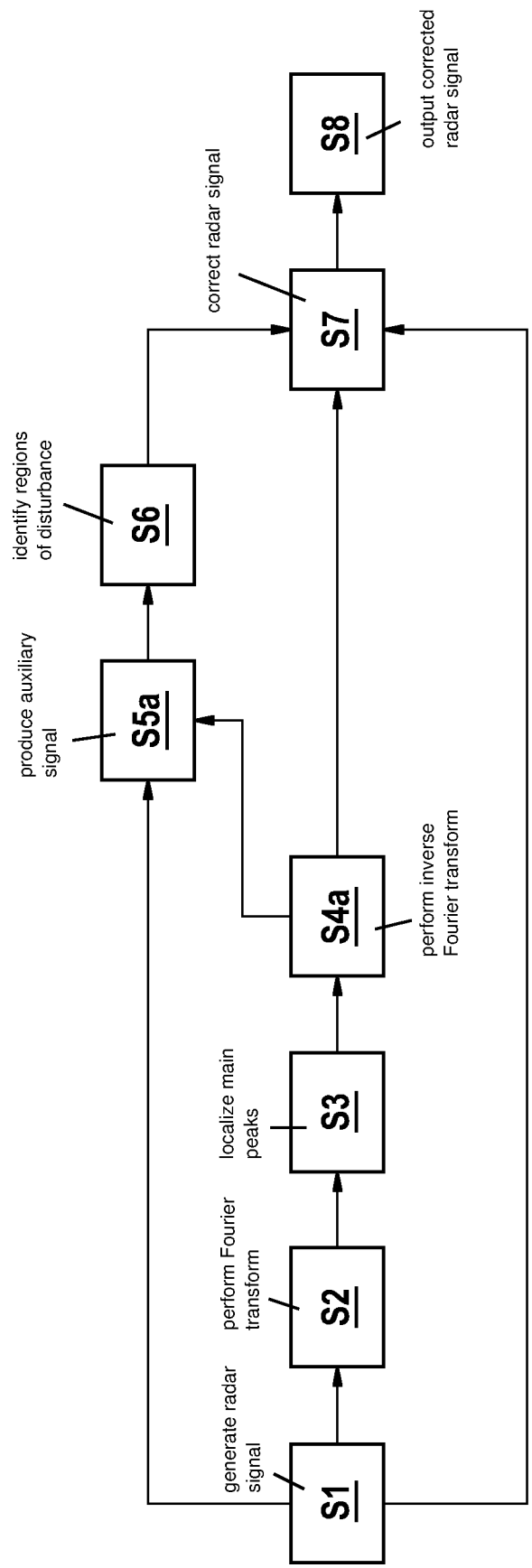
FIG. 14 shows a flowchart of a method for correcting a radar signal according to a first specific embodiment of the present invention.

FIG. 14 illustrates a flowchart of an exemplary method in accordance with the present invention for correcting a radar signal 3.

In a method step S1, radar signal 3 is generated by emitting radar waves with the aid of a radar device 2 and picking up the reflections. Besides the main peaks, which result from objects in the area surrounding radar device 2, radar signal 3 exhibits additional shares of noise and shares of interference. The shares of interference are corrected in the following steps.

To that end, in a method step S2, a Fourier transform is performed on radar signal 3, in order to obtain the spectrum of radar signal 3.

In step S3, the main peaks in the spectrum are localized, for instance, with the aid of a CFAR (constant false alarm rate) algorithm.

In method step S4a, an inverse Fourier transform is performed on the components of the main peaks in the spectrum, in order to generate a main signal in the time domain.

By subtracting the main signal from radar signal 3, an auxiliary signal 5 is produced in method step S5a. In method step S6, regions of disturbance 6 are identified in auxiliary signal 5, for instance, on the basis of threshold values.

In method step S7, a corrected radar signal is generated by correcting original radar signal 3 in detected regions of disturbance 6 with the aid of the corresponding sections of the main signal.

The corrected radar signal is output in method step S8.

Figure 15:
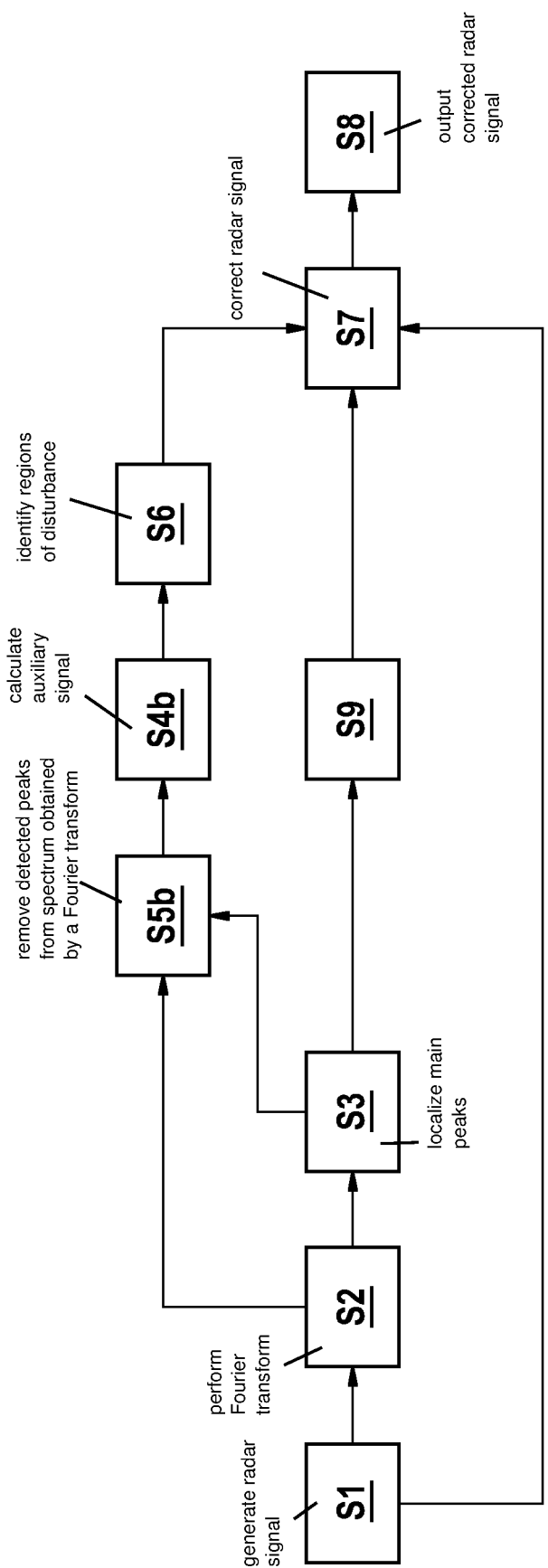
FIG. 15 shows a flowchart of a method for correcting a radar signal according to a second specific embodiment of the present invention.

FIG. 15 illustrates a flowchart of a method for correcting a radar signal 3 according to a further specific embodiment of the present invention. In contrast to the method illustrated in FIG. 14, the components of the main peaks are already subtracted in the frequency domain. Accordingly, in step S5b, the detected peaks are removed from the spectrum obtained by a Fourier transform, to thus generate a difference signal. In a following step S4b, the auxiliary signal is calculated from the difference signal by an inverse Fourier transform. The advantage of this specific embodiment is that different spectral components may also be taken into account for detecting the regions of disturbance and for correcting radar signal 3. For instance, low spectral components may be suppressed for determining the regions of disturbance.

Figure 16:
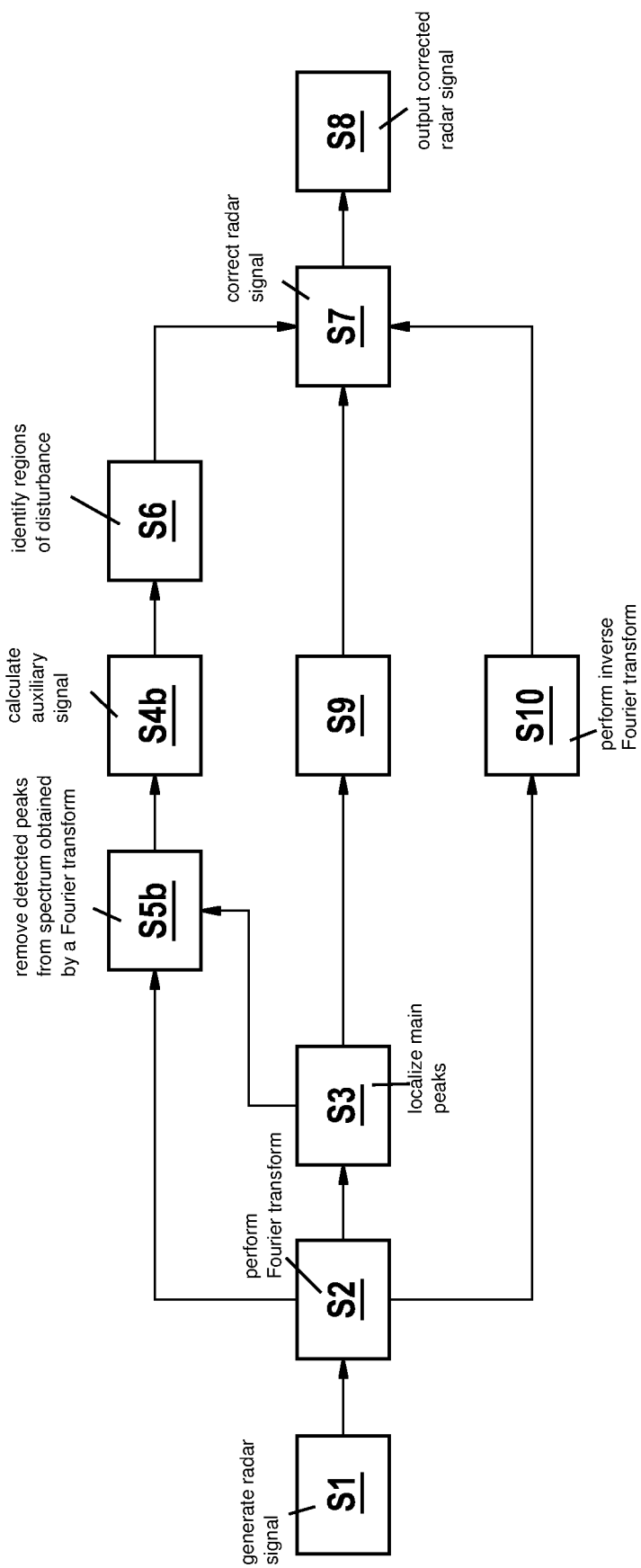
FIG. 16 shows a flowchart of a method for correcting a radar signal according to a third specific embodiment of the present invention.

A further method is illustrated in the flowchart in FIG. 16. Here, a Fourier transform is performed on radar signal 3 in method step S2. Radar signal 3 is then no longer needed and may be deleted, for example. The final correction in step S7 is carried out on the basis of radar signal 3 recovered from the spectrum by an inverse Fourier transform in a method step S10. The remaining steps proceed analogously to the two first-named methods.

What is claimed is:

1. A method comprising the following steps:
obtaining a radar signal in a time domain;
performing a Fourier transformation to convert the radar signal from the time domain to a frequency domain;
ascertaining main peaks in the radar signal in the frequency domain obtained by the performed Fourier transformation;
performing an inverse Fourier transformation on the ascertained main peaks to obtain a main peak signal in the time domain;
determining an auxiliary signal in the time domain by either:
removing the main peak signal from the radar signal in the time domain; or
removing the main peaks from the radar signal in the frequency domain to obtain the auxiliary signal in the frequency domain, and performing an inverse Fourier transformation to convert the auxiliary signal from the frequency domain to the time domain;
identifying a region of disturbance in the radar signal in the time domain based on an analysis of the auxiliary signal in the time domain;
determining an interpolated signal section for the identified region of disturbance by interpolating a portion of the main peak signal that is in the time domain; and
generating a corrected radar signal by replacing the identified region of disturbance in the radar signal in the time domain with the determined interpolated signal section.

2. The method as recited in claim 1, wherein the ascertaining of the main peaks is performed using a peak-detection algorithm.

3. The method as recited in claim 1, wherein a starting instant or final instant of the region of disturbance is detected by identifying that a change in an amplitude of the auxiliary signal in the time domain exceeds a predetermined threshold value.

4. The method as recited in claim 1, wherein the region of disturbance is determined as a smallest time domain within which lie all instants at which an amplitude of the auxiliary signal in the time domain exceeds a predetermined threshold value.

5. The method as recited in claim 1, wherein the auxiliary signal in the time domain is determined by the removing of the main peak signal from the radar signal in the time domain.

6. The method as recited in claim 1, wherein the auxiliary signal in the time domain is determined by the removing of the main peaks from the radar signal in the frequency domain to obtain the auxiliary signal in the frequency domain, and the performing of the inverse Fourier transformation to convert the auxiliary signal from the frequency domain to the time domain.

7. The method as recited in claim 1, wherein the radar signal in the time domain in which the replacement is performed is recovered by performing an inverse Fourier transformation of the radar signal in the frequency domain that had been obtained by the Fourier transformation.

8. An apparatus comprising:
an interface which is configured to receive a radar signal in a time domain; and
a computing device that is coupled to the interface and is configured to:
perform a Fourier transformation to convert the radar signal from the time domain to a frequency domain;
ascertain main peaks in the radar signal in the frequency domain obtained by the performed Fourier transformation;
perform an inverse Fourier transformation on the ascertained main peaks to obtain a main peak signal in the time domain;
determine an auxiliary signal in the time domain by either:
removing the main peak signal from the radar signal in the time domain; or
removing the main peaks from the radar signal in the frequency domain to obtain the auxiliary signal in the frequency domain, and performing an inverse Fourier transformation to convert the auxiliary signal from the frequency domain to the time domain;

identify a region of disturbance in the radar signal in the time domain based on an analysis of the auxiliary signal in the time domain; and generate a corrected radar signal by replacing the identified region of disturbance in the radar signal in the time domain with a determined interpolated signal section.

9. A radar device comprising:

a transmission/reception unit configured to emit radar waves, receive reflections of the radar waves, and output a radar signal based on the received reflections; and an apparatus for correcting a radar signal, wherein the apparatus includes an interface which is configured to receive the radar signal, and a computing device that is coupled to the interface and is configured to:

perform a Fourier transformation to convert the radar signal from the time domain to a frequency domain;

ascertain main peaks in the radar signal in the frequency domain obtained by the performed Fourier transformation;

perform an inverse Fourier transformation on the ascertained main peaks to obtain a main peak signal in the time domain;

determine an auxiliary signal in the time domain by either:

removing the main peak signal from the radar signal in the time domain; or removing the main peaks from the radar signal in the frequency domain to obtain the auxiliary signal in the frequency domain, and performing an inverse Fourier transformation to convert the auxiliary signal from the frequency domain to the time domain;

identify a region of disturbance in the radar signal in the time domain based on an analysis of the auxiliary signal in the time domain; and generate a corrected radar signal by replacing the identified region of disturbance in the radar signal in the time domain with a determined interpolated signal section.

10. The method as recited in claim 5, wherein the radar signal in the time domain from which the main signal is removed is recovered by performing an inverse Fourier transformation of the radar signal in the frequency domain that had been obtained by the Fourier transformation.

\* \* \* \* \*